United States Patent
Nguyen et al.

(10) Patent No.: US 10,019,302 B2
(45) Date of Patent: Jul. 10, 2018

(54) WORKFLOW ENGINE FOR TROUBLESHOOTING USER DEVICE ISSUES

(71) Applicant: T-Mobile USA, Inc., Bellevue, WA (US)

(72) Inventors: Alex Nguyen, Bellevue, WA (US); Jonathan Michael Soini, Seattle, WA (US); Timothy Adam Shelton, North Bend, WA (US)

(73) Assignee: T-Mobile USA, Inc., Bellevue, WA (US)

(*) Notice: Subject to any disclaimer, the term of this patent is extended or adjusted under 35 U.S.C. 154(b) by 123 days.

(21) Appl. No.: 15/045,046

(22) Filed: Feb. 16, 2016

(65) Prior Publication Data
US 2017/0235628 A1 Aug. 17, 2017

(51) Int. Cl.
*G06F 11/00* (2006.01)
*G06F 11/07* (2006.01)

(52) U.S. Cl.
CPC ........ *G06F 11/0781* (2013.01); *G06F 11/079* (2013.01); *G06F 11/0709* (2013.01); *G06F 11/0751* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,266,478 B2* | 9/2012 | Fan | ...... | G06F 11/079 714/26 |
| 8,612,807 B2* | 12/2013 | Collins, Jr. | ...... | G07F 19/207 714/57 |
| 8,707,201 B1* | 4/2014 | Aradhye | ...... | G06F 17/3053 715/204 |
| 2006/0039547 A1* | 2/2006 | Klein | ...... | H04M 3/523 379/265.02 |
| 2007/0002736 A1* | 1/2007 | Gade | ...... | H04L 63/1408 370/230 |

* cited by examiner

*Primary Examiner* — Amine Riad
(74) *Attorney, Agent, or Firm* — Han Santos, PLLC

(57) ABSTRACT

A workflow engine may be used to resolve service issues in a more expedient and effective manner. The workflow engine may select a troubleshooting flow to detect problems associated with a user device that uses communication services provided by a wireless telecommunication network. The workflow engine may determine alert notifications that are relevant to the troubleshooting operations. The workflow engine may make such a determination based on information from multiple data sources of the wireless telecommunication network. The workflow engine may further assign priority ratings to the alert notifications. Subsequently, a presentation layout may be assigned to the troubleshooting operations of the troubleshooting flow and the alert notifications by the workflow engine based on the priority ratings. The troubleshooting operation and the alert notifications are then provided for presentation on a computing device according to the presentation layout by the workflow engine.

20 Claims, 7 Drawing Sheets

WORKFLOW ENGINE FOR TROUBLESHOOTING USER DEVICE ISSUES

BACKGROUND

Mobile devices are integral to the daily lives of most users. Mobile devices are used to make voice calls, check email and text messages, update social media pages, stream media, browse websites, and so forth. As a result, users of mobile devices expect a mobile telecommunication carrier to provide constant and reliable telecommunication and data communication services at all times.

The reliability of telecommunication and data communication services may be affected by multiple factors, such as geography and terrain, device features and capabilities, as well as network infrastructure and network coverage deployment. While some users prefer to call customer care of the mobile telecommunications carrier at the earliest symptoms of service problems, other users may be more technology savvy and prefer to use self-help to solve the problems before contacting customer care. However, with the ever increasing complexity of contemporary mobile devices and wireless telecommunication networks, users may become overwhelmed by the amount of device and network parameters that can be affect communication service performance.

While troubleshooting checklists can be used by users and customer care representatives alike to systematically analyze and solve service problems, such troubleshooting checklists may be laborious and time consuming to use. Further, some troubleshooting checklists may not be tailored to the specific user devices that are experiencing the service problems. Other troubleshooting checklists are developed with the assumption that a user has a certain level of familiarity with the features of a user device. This may pose difficulty in a situation where the customer service representative is providing remote support via telephone and the user actually lacks such familiarity. Accordingly, the use of troubleshooting checklists may on occasions lead to frustration for both the user and the customer care representative.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
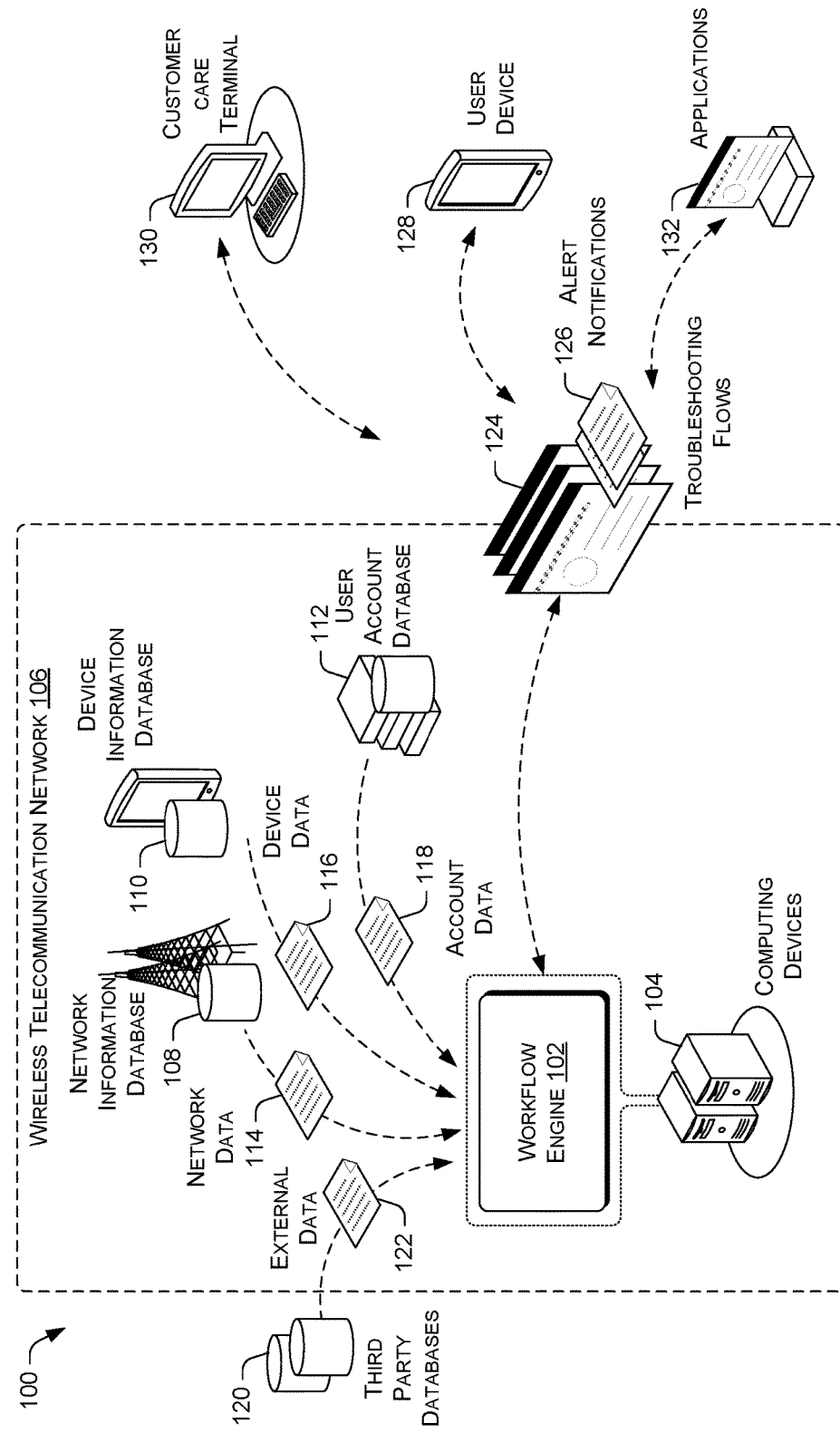
FIG. 1 illustrates an example architecture for deploying a workflow engine for troubleshooting user devices.

This disclosure is directed to techniques for using a workflow engine to troubleshoot and resolve issues with user devices that use the communication services provided by a wireless telecommunication network. In some instances, the issues may be network coverage problems that affect the ability of the user device to access the communication services. For example, the network coverage problem may manifest itself as frequently dropped calls, incomplete calls, slow data downloads or uploads, and/or other symptoms. In other instances, the issues may be related to compatibility of a user device with the service, return, exchange, or upgrade policies of a telecommunication carrier that operates the wireless telecommunication network. For example, a user device may have installed software or enabled application features that make the user device incompatible with such policies of the telecommunication carrier. Accordingly, the workflow engine may automatically detect such issues and provide a troubleshooting flow of troubleshooting operations and alert notifications. In various embodiments, a troubleshooting flow may be in the form a troubleshooting checklist that lists multiple troubleshooting operations. The multiple troubleshooting operations may be organized according to categories and/or subcategories of topics. The topics may include issues, issue symptoms, hardware components, software components, services, and/or so forth. The troubleshooting operations may offer technical information, device setting modifications, links to software fixes, and/or so forth that resolve the issue.

In some embodiments, the workflow engine may automatically filter out troubleshooting operations in a troubleshooting flow for a user device based on an audience type for the flow, a user device type, and/or a user account type. In other embodiments, the workflow engine may automatically eliminate troubleshooting operations in the troubleshooting flow for the user device when information can be extracted from one or more network databases to render the troubleshooting operation moot. The network databases may include a network information database, a device information database, and a user account database.

The workflow engine may further generate alert notifications for one or more of the troubleshooting operations in the troubleshooting flow. In various embodiments, the alert notifications may be generated based on data obtained from the one or more network databases. Subsequently, the troubleshooting operations and associated alert notifications may be prioritized based on priority ratings that are assigned to the alert notifications. For example, each priority rating may be a high alert rating, a medium alert rating, and a low alert rating. The priority ratings may be assigned based on priority thresholds developed from data obtained from the one or more network databases. The priority ratings of the alert notifications may be used to determine the presentation emphasis placed on each alert notification and its associated troubleshooting operation.

In various embodiments, the workflow engine may collect feedback on the effectiveness of the alert notifications and the troubleshooting operations. The feedback may be used by the workflow engine to modify the presentation of the troubleshooting operations and alert modifications. In some instances, the workflow engine may use the feedback to alter the priority thresholds that are used to assign a priority rating to an alert notification. In other instances, the workflow engine may use the feedback to alter the presentation layout of the alert notifications and/or their associated troubleshooting operations. In further embodiments, the workflow engine may collect and analyze statistics on the implementation of multiple troubleshooting flows and troubleshooting results to determine systemic problem trends and the effectiveness of troubleshooting techniques in resolving issues.

The use of device data, network data, and account data to automatically streamline troubleshooting flows and prioritized alert notifications may enable users and customer care representatives of a mobile telecommunication carrier to resolve service issues in a more expedient and effective manner. Further, the use of feedback on the effectiveness of such streamlined troubleshooting flows and prioritized alert notifications may reduce the number of calls to customer care of the mobile telecommunication carrier. The techniques described herein may be implemented in a number of ways. Example implementations are provided below with reference to the following figures.

Example Architecture

FIG. 1 illustrates an example architecture 100 for deploying a workflow engine for troubleshooting user devices. The architecture 100 may include a workflow engine 102. The workflow engine 102 may execute on one or more computing devices 104. The computing devices 104 may include general purpose computers, such as desktop computers, tablet computers, laptop computers, servers, and so forth. However, in other embodiments, the computing devices 104 may include smart phones, game consoles, or other electronic devices that are capable of receive inputs, process the inputs, and generate output data. In various embodiments, the computing devices 104 may be controlled by a mobile telecommunication carrier that provides the wireless telecommunication network 106, or controlled by a third-party entity that is working with the mobile telecommunication carrier.

The workflow engine 102 may access data that are stored on a network information database 108, a device information database 110, and a user account database 112 of the wireless telecommunication network 106. Accordingly, the workflow engine 102 may obtain network data 114 from the network information database 108. The network data 114 may include information regarding the technical and operational status of the wireless telecommunication network. For example, network data of the network may indicate that Long-Term Evolution (LTE) spectrum coverage (or other spectrum coverage) is unavailable in a particular geographical area or that a network node was temporarily overwhelmed with network traffic at a particular time due to a major event.

The device information database 110 may provide the workflow engine 102 with device data 116. The device data 116 may indicate the technical capabilities, feature settings, and operational statuses of user devices. For example, device data for a particular user device may indicate that Wi-Fi calling is enabled on the user device or that the user device is capable of using a specific communication band provided by the wireless telecommunication network. In other examples, the device data for the particular user device may indicate that Wi-Fi calling is disabled on the user device, a developer mode is active on the user device, a location tracking service is active on the user device, and/or so forth.

Furthermore, the workflow engine 102 may obtain the account data 118 from the user account database 112. The user account database 112 may store the account details of multiple users, such as account type, billing preferences, service plan subscription, payment history, data consumed, minutes of talk time used, and/or so forth of each user. For example, the account data of a particular user may indicate that the user has a postpaid account and that the user is current with payments for the subscribed service plan.

In some instances, the workflow engine 102 may further access data from one or more third-party databases 120. Each third-party database may be a database that is provided by a party other than the wireless telecommunication network 106. For example, a third-party database may be provided by a third-party vendor, a third-party contractor, a government entity, another telecommunication carrier, and/or so forth. Each third-party database may contain additional external data 122, such as network-related information, device-related information, and/or user-related information, that supplement the information stored in the databases 110-114. For example, a third-party database may include regulatory information for networks and devices, device manufacturer information, credit information on users, and/or so forth.

The workflow engine 102 may generate troubleshooting flows 124 and alert notifications 126. For example, the workflow engine 102 may generate a troubleshooting flow 124 for the user device 128 upon a request from an application that resides on the user device 128. The application may be a device management application that is responsible for check the health of the user device 128. The device management application may send the request in response to a user input or automatically as a part of a periodic device health check.

Upon receive the request for a troubleshooting flow, the workflow engine 102 may custom tailor one or more troubleshooting flows for the user device 128. In various embodiments, a troubleshooting flow may be tailored for a user device via troubleshooting operation filtering and troubleshooting operation elimination. In troubleshooting operation filtering, the workflow engine 102 may automatically filter out one or more troubleshooting operations from the troubleshooting flow based on an audience type for the flow, a user device type, and/or a user account type. For example, a troubleshooting flow that is modified for a customer care representative may include a troubleshooting operation that calls for the verification of a network status, while such a network status verification may be absent when the troubleshooting flow is intended to be viewed by an end user. In another example, some of the steps in a troubleshooting flow may be filtered out in consideration of the operating system of the user device (e.g., troubleshooting operations specific to the Android operating system may be filter out of an equivalent troubleshooting list for the Apple iOS™ operating system). In an additional example, some of the steps in a troubleshooting flow may be filtered out depending on when the user account is a prepaid account rather than a postpaid account.

To perform troubleshooting operation elimination, the workflow engine 102 may automatically eliminate troubleshooting operations from the troubleshooting flow when corresponding information may be extracted from other sources, such as the network information database 108, the device information database 110, the user account database 112, and/or the third party database 120. For example, a troubleshooting operation in the troubleshooting flow may be to verify that the user device is still under warranty.

However, because the workflow engine 102 is able to access the device information database 110, the workflow engine 102 may determine the warranty status of the user device. As a result, this troubleshooting operation may be eliminated from the troubleshooting flow.

The workflow engine 102 may further generate the alert notifications 126 for one or more of the troubleshooting operations in a troubleshooting flow. In various embodiments, the alert notifications 126 may be generated based on data obtained from the network information database 108, the device information database 110, the user account database 112, and/or the third-party database 120. The workflow engine 102 may generate an alert notification when data from at least one database indicates that one or more predetermined alert criteria are met.

For example, the workflow engine 102 may determines from the network data 114 that the user device 128 is in a geographical location with cellular signal strength that falls below a predetermined signal strength threshold. Additionally, the workflow engine 102 may determine from the device data 116 that the Wi-Fi calling feature is disabled on the user device 128. As a result, the workflow engine 102 may generate an alert notification for the user device 128 that recommends an activation of the Wi-Fi calling feature.

Subsequently, the workflow engine 102 may further prioritized the troubleshooting operations and associated alert notifications based on priority ratings that are assigned to the alert notifications. In at least one embodiment, a priority rating may be high alert, medium alert, low alert, or no alert. The priority ratings may be assigned based on priority thresholds developed from data obtained from the one or more network databases. For example, a user device receiving a network signal that is less than 25% may be assigned a high alert priority rating on a particular summer day. However, the same network signal percentage may be assigned a medium alert priority on a particular winter day due to seasonal variance in the signal output of a network node.

The priority ratings of the alert notifications may impact the presentation of the alert notifications and their associated troubleshooting operations. For example, troubleshooting operations that are affiliated with high priority alert notifications may be presented higher on a troubleshooting flow than troubleshooting operations that are affiliated with medium or low priority alert notifications. Further, the workflow engine may configure higher priority alert notifications and associated troubleshooting operations with visual cues that attract more user attention than visual cues for lower priority alert notifications and associated troubleshooting operations. The visual cues may include specific symbols, data formats, fonts, color combinations, and/or so forth.

The workflow engine 102 may generate multiple troubleshooting flows and associated alert notifications for a user device, such as the user device 128. In at least one embodiment, the multiple troubleshooting flows may be organized in categories and subcategories, such that the multiple flows may be browsed via a directory tree structure. The workflow engine 102 may generate troubleshooting flows and alert notifications for a user device in response to requests for other sources. Such sources may include an application that is installed at a customer care terminal 130. The customer care terminal 130 may be a computing device that is used by a customer care representative of a wireless communication carrier that operates the wireless telecommunication network 106.

Alternatively, the workflow engine 102 may generate troubleshooting flows and alert notifications based on request from additional applications 132. The applications 132 may include a network management application, a network troubleshooting application, a third party device monitoring application, and/or so forth. Such applications 132 may periodically or continuously send troubleshooting requests to the workflow engine 102 for multiple user devices. In this way, these applications 132 may monitor user devices that use the wireless telecommunication network 106 for systemic problem trends with specific user devices, emerging or ongoing network issues, and/or new subscriber behavior patterns.

In some instances, the workflow engine 102 may collect feedback on the effectiveness of the alert notification and their troubleshooting operations. The feedback may be used by the workflow engine 102 to modify the presentation of the troubleshooting flow 124 and alert notifications 126. In some instances, the workflow engine 102 may use the feedback to alter the priority thresholds that are used to assign a priority rating to an alert notification. In other instances, the workflow engine 102 may use the feedback to alter the presentation layout of the alert notifications and/or their associated troubleshooting operations. In further embodiments, the workflow engine 102 may collect and analyze statistics on the troubleshooting implementation and troubleshooting results to determine emerging systemic problem trends and the effectiveness of troubleshooting techniques. In this way, the workflow engine 102 may assist network engineers and other staff of the mobile telecommunication carrier in preempting problems, applying the most effective solutions to issues, and reducing customer care workload.

Example Computing Device Components

Figure 2:
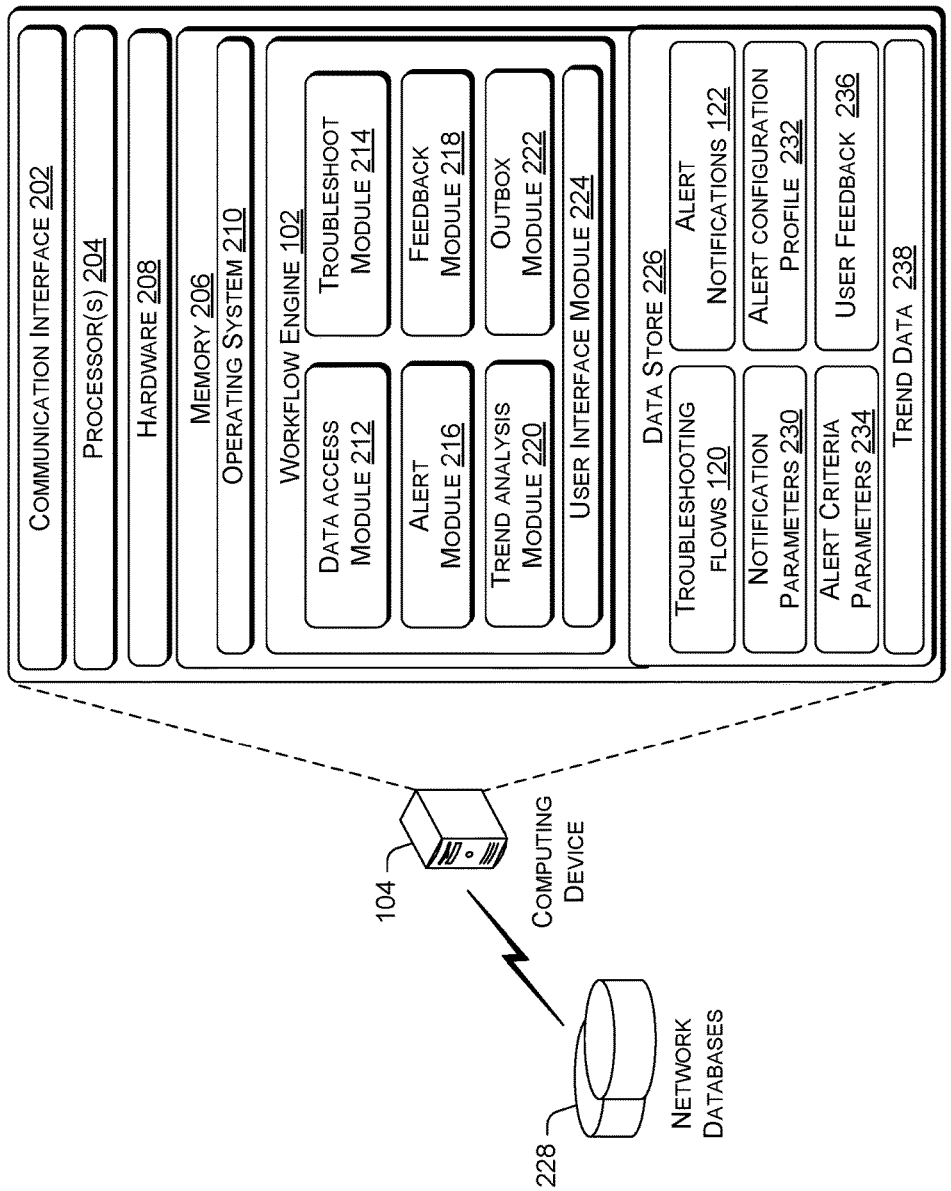
FIG. 2 is a block diagram showing various components of one or more illustrative computing devices that implement the workflow engine for troubleshooting user devices.

FIG. 2 is a block diagram showing various components of one or more illustrative computing devices that implement the workflow engine for troubleshooting user devices. The computing devices 104 may include a communication interface 202, one or more processors 204, memory 206, and hardware 208. The communication interface 202 may include wireless and/or wired communication components that enable the server to transmit data to and receive data from other networked devices. The hardware 208 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 204 and the memory 206 of the computing devices 104 may implement an operating system 210 and the workflow engine 102. The operating system 210 may include components that enable the computing devices 104 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The workflow engine 102 may include a data access module 212, a troubleshoot module 214, an alert module 216, a feedback module 218, a trend analysis module 220, an outbox module 222, and a user interface module 224. The modules may include routines, program instructions, objects, and/or data structures that perform particular tasks or implement particular abstract data types. The memory 206 may also include a data store 226 that is used by the workflow engine 102.

The data access module 212 may retrieve data from the network databases 228. The network databases 228 may include the network information database 108, the device information database 110, and the user account database 112. In some instances, the network databases 228 may also include the one or more third-party databases 120 In various embodiments, the data access module 212 may retrieve data that are relevant to a particular user device from the network databases 228 in response to commands from the troubleshoot module 214 or the alert module 216. The relevant data for a user device may include any of the network data 114, device data 116, the account data 118, or the external data 122 that affect the ability of the wireless telecommunication network 106 to provide communication services to the user device.

In some embodiments, the data access module 212 may have the ability to directly query a user device for device information. In such embodiments, a query that is initiated by the data access module 212 may be received by a device management application on the user device. In turn, the device management application may provide a response that includes the device information being queried. For example, the data access module 212 may initiate a query to determine whether Wi-Fi calling is enabled on a user device, and the device management application may respond with the Wi-Fi calling enablement status of the user device. In at least one embodiment, the user may have the ability to select whether device management application is to respond to queries from the data access module 212 through a configuration setting of the application. In this way, the user may be given an opportunity to opt out of providing information to the data access module 212.

The troubleshoot module 214 may initiate troubleshooting flows for a user device or a group of devices. The troubleshooting flows may be initiated based on a request from an application on a user device or an application that is under control of a mobile telecommunication carrier that is operating the wireless telecommunication network 106. The application on the user device may be a device management application that monitors the health of the user device or a quality of the communication services provided to the user device. The application that is controlled by the mobile telecommunication carrier may be a customer care application that is used by a customer care representative or a network management application that monitors the overall health of the wireless telecommunication network 106.

The troubleshoot module 214 may initiate a troubleshooting flow as part of a recurring monitoring procedure that is triggered by an application. For example, the network management application may initiate one or more troubleshooting flows to detect systemic issues that affect a specific type of user devices, a specific hardware or software user device platform, and/or a specific portion of the wireless telecommunication network 106. Alternatively, the troubleshoot module 214 may initiate a troubleshooting flow when a troubleshooting request from an application indicates that the user device is affected by one or more specific symptoms. The application may automatically detect the symptoms or the symptoms may be manually inputted into the application by a user.

In various embodiments, the multiple troubleshooting flows that are initiated for a user device may be organized into categories and subcategories, such that the multiple flows may be browsed via a directory tree structure. The troubleshoot module 214 may customize each troubleshooting flow for a user device or a group of user devices by performing troubleshooting operation filtering and/or troubleshooting operation elimination for each troubleshooting flow. The customization may reduce the consumption of computing resources and speed up the implementation of the troubleshooting flows to detect problems. Each of the troubleshooting operations may offer technical information, device setting modifications, links to software fixes, and/or so forth that resolve a particular issue. The technical information may be in the form of knowledge base articles, and the device setting modifications may be presented in calls to actions.

In various embodiments, the information that is presented at the troubleshooting operations may vary according to the audience type of the troubleshooting flow. For example, the information presented for a customer care representative by a troubleshooting operation may include a link that enables the representative to verify a network setting from the network information database 108. However, such a link may be absent when the troubleshooting operation is a part of a troubleshooting flow that is intended for viewing by a user of the user device. In some instances, the troubleshoot module 214 may determine the audience type for the troubleshooting flow based on an identity of the application that initiated the request for the troubleshooting flow.

The alert module 216 may generate alert notifications for one or more troubleshooting operations of a troubleshooting flow. In various embodiments, the alert notifications may be generated based on data obtained from the network information database 108, the device information database 110, the user account database 112, and/or the third-party database 120. The alert module 216 may generate an alert notification when data from at least one database indicates that one or more predetermined alert criteria are met. For example, the workflow engine 102 may determine from the network data 114 that the user device 128 is in a geographical location with cellular signal strength that falls below a predetermined signal strength threshold. Additionally, the workflow engine 102 may determine from the device data 116 that the Wi-Fi calling feature is disabled on the user device 128. As a result, the workflow engine 102 may generate an alert notification for the user device 128 that recommends an activation of the Wi-Fi calling feature. In other embodiments, example metrics used as alert criteria may include call drop rates, data throughputs, quantity of data usage, network events and/or settings, device events and/or settings, billing events and/or settings, etc.

The alert module 216 may selectively provide alert notifications for presentation based on user inputs. A user may input a set of configurations to customize whether specific alert notifications regarding a user device is to be displayed for a user device. Such user inputs may be stored as notification parameters 230 for the alert notifications in the data store 226. For example, the device data 116 from the device information database 110 may indicate that a developer mode is enabled for the user device 128. However, the user of the user device 128 may choose to turn off this alert notification because the user is a developer. In another example, the account data 118 for the user device 128 may indicate that data service for the user device 128 is throttled due to data usage that exceeded available data allocation for the billing period. In such a scenario, the user of the user device 128 may provide an input to the alert module 216 that turns off such an alert notification until the next billing period starts. In various embodiments, an alert notification may be disable on a permanent basis or on a temporarily basis for a predetermined amount of time.

The alert module 216 may prioritize the troubleshooting operations and associated alert notifications of a troubleshooting flow based on a priority rating that is assigned to each alert notification. For example, the priority ratings may include high alert, medium alert, low alert, and no alert. In various embodiments, the priority thresholds for the multiple priority ratings may be determined based on information obtained from one or more network databases 228. For example, the information may include signal strength values of network signals that are received at various user devices, the data download speed experienced by the user devices, statistics on the number of dropped calls at the user devices, etc. In such embodiments, each of the priority thresholds may signify a point at which an issue warrants a different amount of attention or a different response from a user due to either an increase or a decrease in the severity of the issue. For example, as the signal strength of a telecommunication drops to less than 10%, the signal strength problem may become a high priority issue instead of a medium priority issue.

Once the priority thresholds are established, the alert module 216 may compare a parameter value of a parameter that is the subject an alert notification with the multiple priority thresholds to assign a priority value to the alert notification. In one example, the alert module 216 may establish priority thresholds that correspond to the signal quality of a network signal that is received by a user device. In such an example, the priority thresholds may be 30% signal strength for a low alert, 20% signal strength for a medium alert, and 10% signal strength for a high alert. Thus, a received network signal at a user device that is higher than 30% triggers no alert. However, a received network signal at the user device that is lower than 30% but higher than 20% may trigger a low alert rating. Likewise, a received network signal at the user device that is 20% or lower but higher than 10% may trigger a medium alert rating, and a received network signal at the user device that is 10% or less may trigger a high alert rating.

In another example, the alert module 216 may establish priority thresholds that corresponding to a data download speed that is experienced by a user device. In such an example, the priority thresholds may be five Megabits per second (Mbps) for a low alert, three Mbps for a medium alert, and two Mbps for a high alert. Thus, a data download speed experienced by the user device that is higher than five Mbps triggers no alert. However, a data download speed at the user device that is less than five Mbps but more than three Mbps may trigger a low alert rating. Likewise, a data download speed at the user device that is three Mbps or lower but higher than two Mbps may trigger a medium alert rating, and a data download speed at the user device that is less than two Mbps may trigger a high alert rating.

In an additional example, the alert module 216 may establish priority thresholds that corresponding to a dropped call rate (DCR) that is experienced by a user device. In such an example, the priority thresholds may be 1% DCR for a low alert, 2% DCR for a medium alert, and 3% DCR for a high alert. Thus, a DCR experienced by the user device that is 1% or lower triggers no alert. However, a DCR at the user device that is more than 1% and up to 2% may trigger a low alert rating. Likewise, a DCR at the user device that is more than 2% and up to 3% may trigger a medium alert rating, and a DCR at the user device that is more than 3% may trigger a high alert rating.

In some embodiments, the alert module 216 may update the priority thresholds that are used to assign priority ratings based on data from the network databases 228. The priority ratings may be updated to accommodate environmental factors, network improvements, and/or other influences. For example, priority thresholds in the form of signal strength value ranges may be adjusted based on the network data 114 to accommodate seasonal variability as weather affects network signal transmission and reception. In another example, priority thresholds in the form of DCR percentage value ranges may be reduced as the network data 114 shows that network improvement are made to reduce dropped calls. In an additional example, priority thresholds in the form of data download speed ranges may be increased as data download speed of the wireless telecommunication network 106 improves.

The priority ratings of the alert notifications may impact the presentation of the alert notifications and their associated troubleshooting operations. For example, the alert module 216 may prioritize the presentation of troubleshooting operations that are affiliated with high priority alert notifications than troubleshooting operations that are affiliated with medium or low priority alert notifications. The prioritization may be reflected in the placement a troubleshooting operation and associated alert notification in a troubleshooting flow. For example, higher priority troubleshooting operations and alert notifications may be placed higher in the troubleshooting flow than lower priority troubleshooting operations and alert notifications. The prioritization may also affect the manner in which alert notifications may be presented. For example, the alert module 216 may configure a low priority alert notification so that the notification is solely displayed by a device management application on the user device when the application is launched. A medium priority alert notification may be configured to be displayed by the device management application when the application launched or when a user places a call to customer care. However, a high priority alert notification may be configured so that the device management application surfaces the notification on the home screen of the user device upon user device power up or unlock.

In additional embodiments, the alert module 216 may configure higher priority alert notifications and associated troubleshooting operations with visual cues, audio cues, or audiovisual cutes that attract more user attention than corresponding cues for lower priority alert notifications and associated troubleshooting operations. The visual cues may include specific symbols, data formats, fonts, color combinations, graphics, banners, and/or so forth. The audio cues may include melodies, tones, music, spoken speech, and/or so forth. The presentation configuration settings for different priority levels of alert notifications may be stored in an alert configuration profile 232 in the data store 226.

The feedback module 218 may collect feedback on the effectiveness of the troubleshooting operations and alert notifications. In some of the embodiments, a troubleshooting operation or an alert notification may be equipped with an effectiveness rating interface. The effectiveness rating interface may enable a user to make a binary assertion of whether the associated step or notification was helpful or not helpful in resolving an issue. Alternatively, the effectiveness rating interface may be a rating scale that enables a user to assign a scale value to the helpfulness of the associated step or notification in resolving the issue. In such instances, the feedback module 218 may aggregate the effectiveness ratings of each troubleshooting operation or each alert notification over a time period to produce effectiveness statistics. Such effectiveness statistics may be used by designers to modify the troubleshooting flows or alert notifications. The modifications for a troubleshooting flow may include changing the hierarchy of the troubleshooting operations in a directory tree structure, changing one or more knowledge base articles, changing one or more calls to action, and/or so forth. The modifications for an alert notification may include changing the content, the visual appearance of the alert notification, the audio content of the alert notification, and/or so forth.

In other embodiments, the effectiveness statistics for an alert notification may be used to modify the priority thresholds that are used to assign a priority rating to the alert notification. For example, the effectiveness statistics may show that users are more responsive to alert notifications when the priority rating of the alert notification are high. Accordingly, the priority thresholds for an alert notification may be adjusted so that another alert notification of the same type will have a high priority rating instead of a medium or low priority rating. In additional embodiments, the effectiveness statistics for an alert notification may be used to modify the presentation format of the alert notification. For example, the effectiveness statistics may show that users respond to specific types of visual or audio indicators more than other types of visual or audio indicators. Hence, the specific types of visual or audio indicators result in a higher resolution of an issue across multiple user devices. Accordingly, a designer of the alert notification may change the presentation of the alert notification to obtain a higher rate of issue resolution.

The trend analysis module 220 may generate troubleshooting requests on a continuous or periodic basis. Alternatively, the trend analysis module 220 may be programmed to generate the request upon the occurrence of certain trigger events. For example, the event may be the release of a new line of user devices, the introduction of a new service plan by the mobile telecommunication carrier, etc. The troubleshooting requests may cause the troubleshoot module 214 to execute troubleshooting flows. The trend analysis module 220 may collect the results of the troubleshooting flows for analysis. Accordingly, the trend analysis module 220 may use machine learning to detect trends or patterns in the results generated by the troubleshooting flows. In various embodiments, the machine learning may make use of techniques such as supervised learning, unsupervised learning, semi-supervised learning, naïve Bayes, Bayesian networks, decision trees, neural networks, fuzzy logic models, and/or probabilistic classification models.

The trend analysis module 220 may generate trends that indicate emerging issues with specific user devices, service plans, and/or network infrastructure. A trend may provide statistics on an issue in near real-time or on a periodic basis, such as hourly, daily, weekly, etc. As a result, appropriate warnings and solutions may be disseminated to users and customer care representatives via troubleshooting operations and alert notifications. For example, the trend analysis module 220 may detect a spike in the number of battery alerts on a particular day. Subsequently, the trend analysis module 220 may infer that the spike in the number of battery alerts coincides with the release of a new line of user devices. Accordingly, administrators of the wireless telecommunication network 106 may modify troubleshooting operations and alert notifications for the line of user devices to provide information and techniques for battery conservation.

In some embodiments, the trend analysis module 220 may be used to analyze multiple trends, such as comparing current trends to historical trends. For example, a current trend for a particular issue, such as battery alerts for a particular line of user devices at launch, may be compared to battery alerts for another line of user devices at launch. Such comparisons may provide insight into long term evolution of technology and issues that have surfaced or disappeared as a result of such evolution.

The outbox module 222 is a centralized distribution point for requested troubleshooting flows. In this role, the outbox module 222 may distribute troubleshooting flows that are completed by the troubleshoot module 214 and/or the alert module 216 to the corresponding requesting parties. For example, the requesting parties may be applications that are executing on the user device 128, the customer care terminal 130, or the other applications 132. Furthermore, the outbox module 222 may also distribute a troubleshooting flow that is requested by one application to one or more other authorized applications. For example, a network management application of the wireless telecommunication network 106 may routinely download batches of troubleshooting flows that are requested by user devices. Subsequently, the network management application may send the batches of the troubleshooting flows to the trend analysis module 220 for analysis in order to determine potential issues with the network. In other example, a customer care application on the customer care terminal may download troubleshooting flows for a specific type of user device under the direction of a customer care representative. In this way, the customer care representative may ascertain whether a particular issue that is affecting one user device is common to all user devices of that type.

The outbox module 222 may store recent troubleshooting flows for a predetermined time period, so that the troubleshooting flows may be readily made available to one or more applications. The predetermined time period may be the last hour, the last day, the last week, etc. In various embodiments, the outbox module 222 may use protocols such as Hypertext Transfer Protocol (HTTP), File Transfer Protocol (FTP), etc. to deliver data files containing the troubleshooting flows to the applications. Alternatively, the outbox module 222 may use scripting languages such as JavaScript, XML, etc., to pass troubleshooting flow data to the applications.

The user interface module 224 may enable an administrator to interact with the modules of the workflow engine 102 via data input devices and data output devices. In some instances, the administrator may use the user interface module 224 to configure or modify the content of the troubleshoot flows, including specifying the technical information, device setting modifications, links to software fixes, etc. that are associated with each troubleshooting operation. In other instances, the user interface module 224 may enable the administrator to establish or change alert criteria and priority thresholds, configure or modify the content of the alert notifications, as well as configure the manner and style in which alert notifications of different priority rating are presented.

The data store 226 may store information that are used or processed by the workflow engine 102. The data store 226 may include one or more databases, such as relational databases, object databases, object-relational databases, and/or key-value databases. The information may include troubleshooting flows 124, alert notifications 126, notification parameters 230, alert configuration profile 232, and alert criteria 234. Each troubleshooting flow or alert notification may store metadata. The metadata may track identification information of the associated requesting device, the date and time of flow execution or alert notification generation, as well as other information pertaining to the use or access of the flow or alert notification. The alert criteria 234 may be configured to accommodate different types of user devices, different network conditions, different telecommunication service plans, etc. The data store 226 may further store user feedback 236 that are received on the effectiveness of the troubleshooting flows 124 and/or the alert notifications 126, as well as trend data 238 that are generated by the trend analysis module 220.

Additional details regarding the functionalities of the workflow engine 102 are discussed in the context of FIGS. 3-7. Thus, the workflow engine 102 may include other modules that perform the functionalities described in the context of these figures.

Example User Interface

Figure 3:
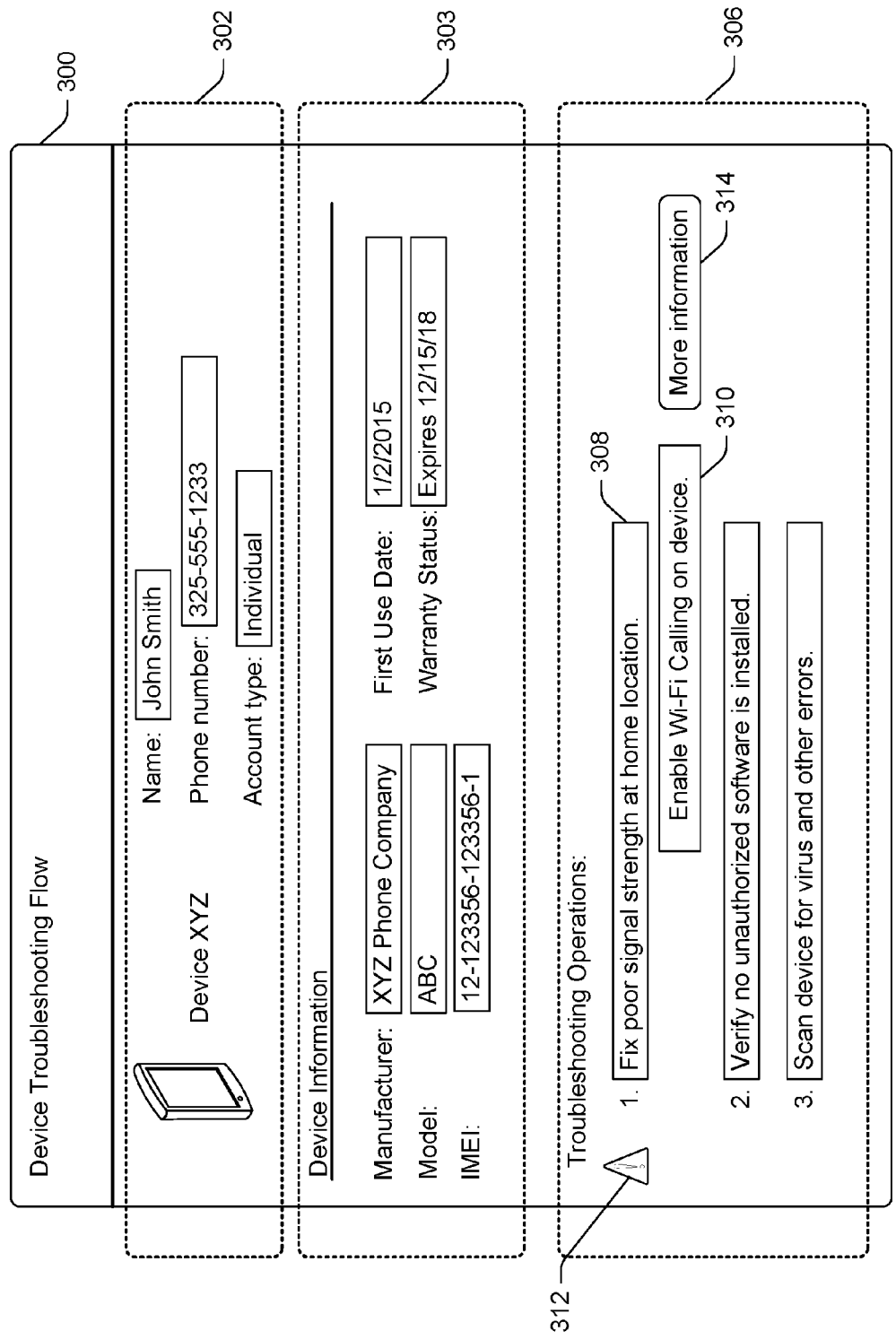
FIG. 3 is an illustrative troubleshooting flow that provides alert notifications for assisting a user in resolving service problems with a user device.

FIG. 3 is an illustrative troubleshooting flow 300 that provides alert notifications for assisting a user in resolving service problems with a user device. The troubleshooting flow 300 may include a subscriber information portion 302, a device information portion 304, and a troubleshoot portion 306. The subscriber information portion 302 may display the identification information of a subscriber. For example, the subscriber information may include the name of the subscriber, account identification of the subscriber, and an account type of the subscriber.

The device information portion 304 may display user device information of an associated user device. The user device information that is displayed may include a manufacturer of the user device, a model name of the user device, a user device identifier of the user device, a device first use date, a device warranty status, and/or so forth.

The troubleshooting portion 306 may include troubleshooting operations for resolving a service issue with the user device. The troubleshooting operation 308 may be accompanied by an alert notification 310. The troubleshooting operation 308 may be ranked higher than the other troubleshooting operations in the troubleshooting portion 306 due to the priority rating of the alert notification 310. Further, the troubleshooting operation 308 may be displayed with a visual indicator 312 that alerts a viewer to the importance of the troubleshooting operation 308 and/or the alert notification 310. The alert notification 310 may be further provided with an information control 314 that leads to a knowledge base article or a call to action for resolving a specific issue with the user device.

Example Processes

FIGS. 4-7 present illustrative processes 400-700 for using a workflow engine to troubleshoot and resolve issues with user devices that use the communication services provided by a wireless telecommunication network. Each of the processes 400-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-700 are described with reference to the architecture 100 of FIG. 1.

Figure 4:
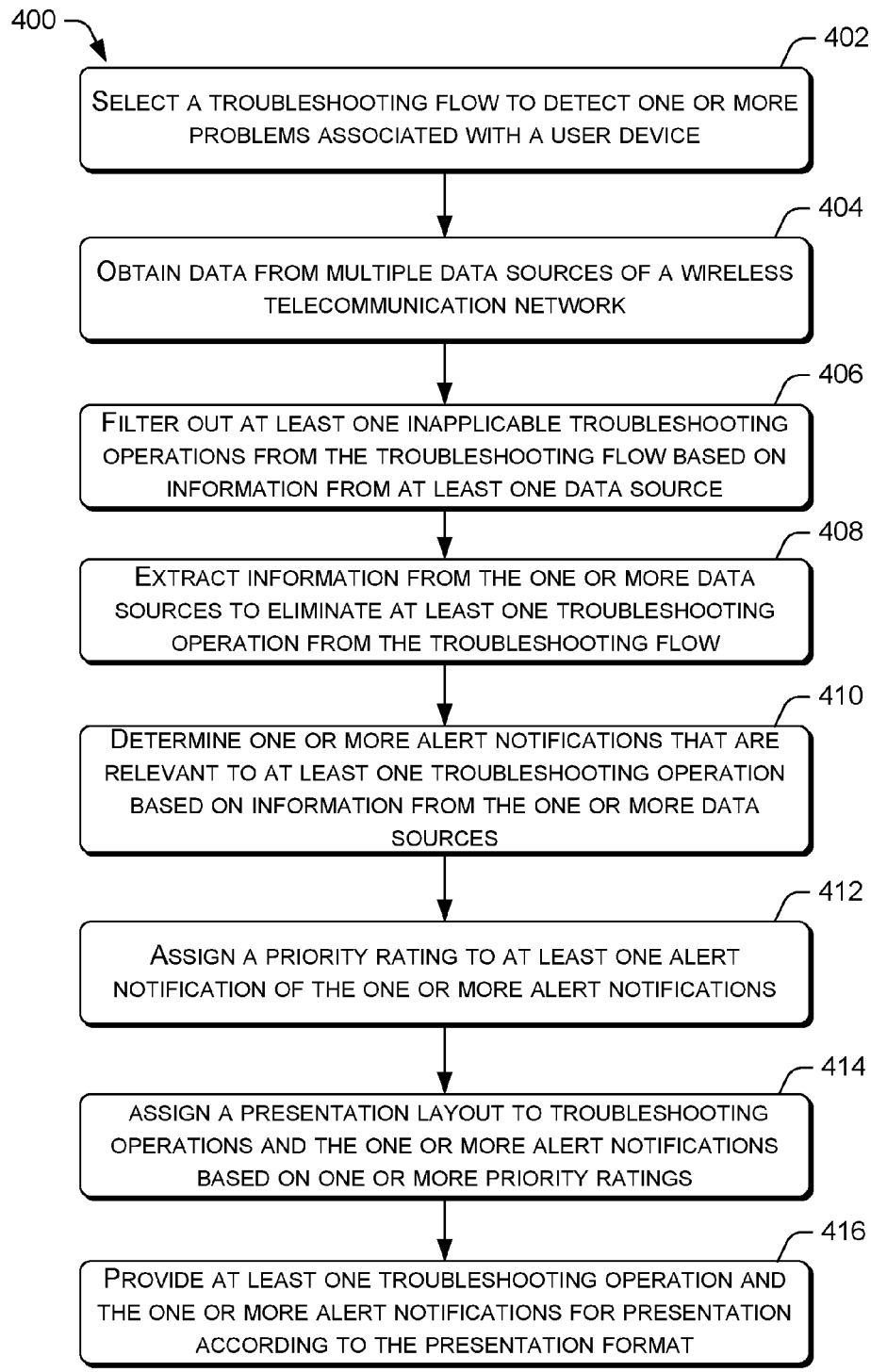
FIG. 4 is a flow diagram of an example process for generating and providing troubleshooting operations and associated alert notifications that assist a user in resolving service problems.

FIG. 4 is a flow diagram of an example process 400 for generating and providing troubleshooting operations and associated alert notifications that assist a user in resolving service problems. At block 402, the workflow engine 102 may select a troubleshooting flow to detect one or more problems associated with a user device that uses the communication services provided by the wireless telecommunication network. In various embodiments, the troubleshooting workflow may be selected by the workflow engine 102 based on an request from an application on the user, an application at a customer care terminal, a network management application of the wireless telecommunication network 106, or some other application. The troubleshooting flow may be selected based on an issue that is reported via the request or as a part of routine monitoring.

At block 404, the workflow engine 102 may obtain data from multiple data sources of the wireless telecommunication network 106. In various embodiments, the multiple data sources may include the network information database 108, the device information database 110, the user account database 112, and the third-party databases 120. The network information database 108 may contain information regarding the technical and operational status of the wireless telecommunication network. The device information database 110 may include data that indicate the technical capabilities, feature settings, and operational statuses of user devices. The user account database 112 may store the account details of the multiple users, such as account type, billing preferences, service plan subscription, payment history, data consumed, minutes of talk time used, and/or so forth of each user.

At block 406, the workflow engine 102 may filter out at least one inapplicable troubleshooting operation from the troubleshooting flow based on information from at least one data source. In various embodiments, troubleshooting operations may be filtered out based on an audience type for the troubleshooting flow, a user device type, and/or a user account type as determined from one or more of the network information database 108, the device information database 110, the user account database 112, and the third-party database 120.

At block 408, the workflow engine 102 may extract information from the one or more data sources to eliminate at least one troubleshooting operation in the flow. For example, a troubleshooting operation may be to verify that the user device is still under warranty. However, because the workflow engine 102 is able to access the device information database 110, the workflow engine may determine the warranty status of the user device. As a result, this troubleshooting operation may be eliminated from the troubleshooting flow.

At block 410, the workflow engine 102 may determine one or more alert notifications that are relevant to at least one of the troubleshooting operations based on information from the one or more data sources. For example, the workflow engine 102 may determines from network data 114 in the network information database 108 that a user device is in a geographical location with cellular signal strength that falls below a predetermined signal strength threshold. Additionally, the workflow engine 102 may determine from the device data 116 in the device information database 110 that the Wi-Fi calling feature is disabled on the user device. As a result, the workflow engine 102 may generate an alert notification for the user device that recommends an activation of the Wi-Fi calling feature.

At block 412, the workflow engine 102 may assign a priority rating to at least one alert notification of the one or more alert notifications. For example, the priority rating may be high alert, medium alert, low alert, or no alert. The priority ratings may be assigned based on priority thresholds that are developed from data obtained from the one or more data sources.

At block 414, the workflow engine 102 may assign a presentation layout for the troubleshooting operations and the one or more alert notifications based on at least one priority rating. For example, troubleshooting operations that are affiliated with high priority alert notifications may be presented higher in a troubleshooting flow than troubleshooting operations that are affiliated with medium or low priority alert notifications. Further, the workflow engine 102 may configure higher priority alert notifications and associated troubleshooting operations with visual cues that attract more user attention than visual cues for lower priority alert notifications and associated troubleshooting operations.

At block 416, the workflow engine 102 may provide the at least one troubleshooting operation and the one or more alert notifications to a computing device for presentation. In various embodiments, the computing device may be the user device, a customer care terminal, a computing device of the wireless telecommunication network 106, or another computing device that is executing an application which initiated the request for the troubleshooting flow.

Figure 5:
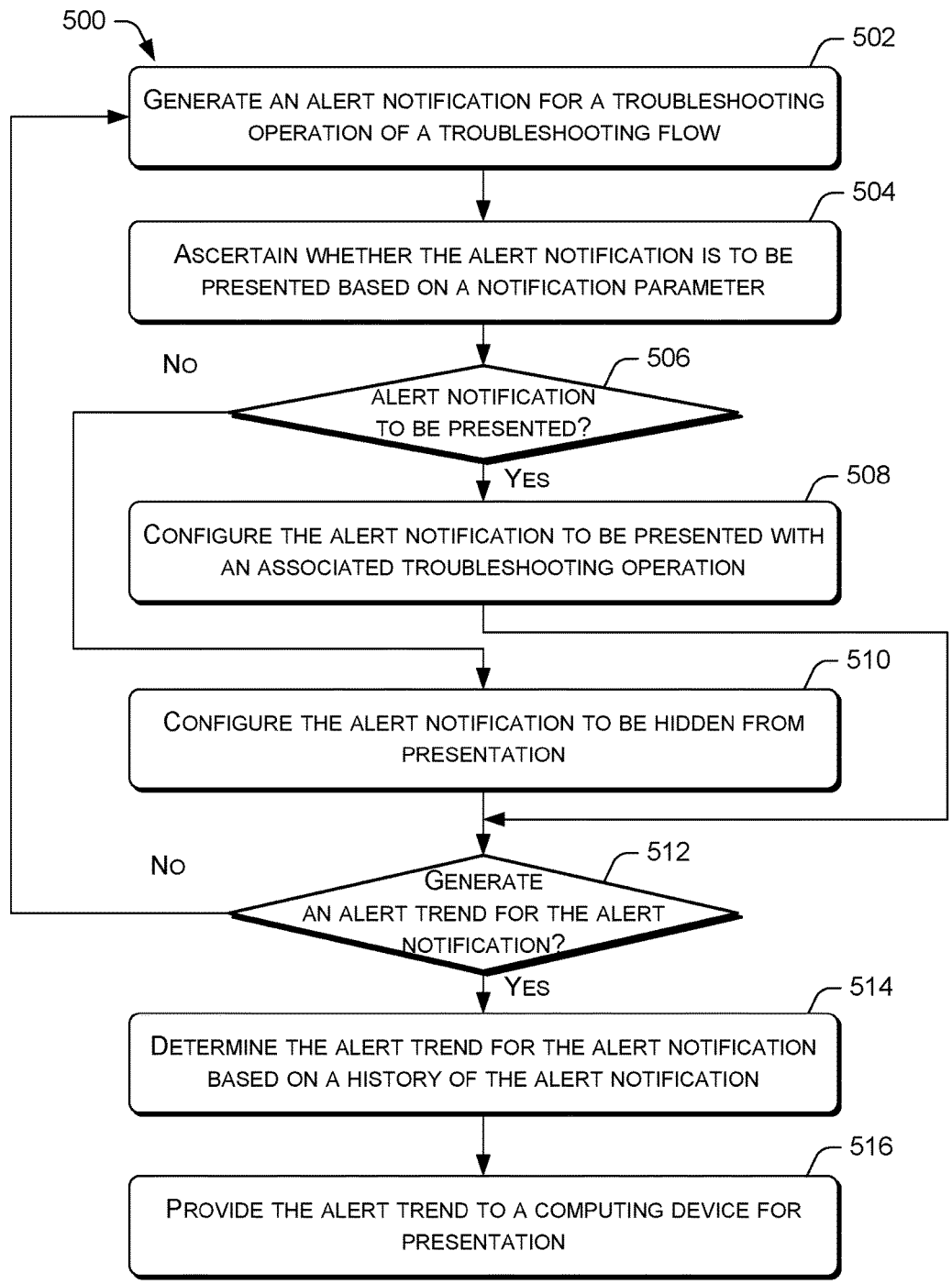
FIG. 5 is a flow diagram of an example process for selecting one or more alert notification for presentation to a user to assist the user in resolving service problems.

FIG. 5 is a flow diagram of an example process 500 for selecting one or more alert notification for presentation to a user to assist the user in resolving service problems. The process 500 may further illustrate block 410 of the process 400. At block 502, the workflow engine 102 may generate an alert notifications for a troubleshooting operation of a troubleshooting flow. The troubleshooting flow may be requested for a user device or a group of user devices. In various embodiments, the alert notification may be generated when data from the one or more data sources indicate that one or more predetermined alert criteria are met.

At block 504, the workflow engine 102 may ascertain whether the alert notification is to be presented based on a notification parameter. For example, the device data 116 from the device information database 110 may indicate that a developer mode is enabled for the user device 128. However, the user of the user device 128 may choose to turn off this alert notification because the user is a developer.

At decision block 506, if the workflow engine 102 determines that the alert notification is to be presented ("yes" at decision block 506), the process 500 may proceed to block 508. At block 508, the workflow engine 102 may configure the alert notification to be presented with an associated troubleshooting operation. However, if the workflow engine 102 determines that the alert notification is not to be presented ("no" at decision block 506), the process 500 may proceed to block 510. At block 510, the workflow engine 102 configured to alert notification to be hidden from presentation.

At decision block 512, the workflow engine 102 may determine whether to generate an alert trend for the alert notification. Accordingly, if the workflow engine 102 determines that an alert trend is to be generated for the alert notification ("yes" at decision block 512), the process 500 may proceed to block 514. At block 514, the workflow engine 102 may generate the alert trend for the alert notification. In various embodiments, the alert trend may be generated based on a history of the alert notification across multiple user devices or for specific user devices, based on a history of the alert notification in combination with the history of one or more other alert notifications, based on a history of the alert notification at specific times, events, geographical locations, and/or so forth.

Accordingly, the workflow engine 102 may generate trends that indicating emerging issues with specific user devices, service plans, and/or network infrastructure. A trend may provide statistics on an issue in near real-time or on a periodic basis, such as hourly, daily, weekly, etc.

At block 516, the workflow engine 102 may provide the alert trend to a computing device for presentation. In various embodiments, the computing device may be the user device, a customer care terminal, a computing device of the wireless telecommunication network 106, or another computing device.

Returning to decision block 512, if the workflow engine 102 determines that an alert trend is not to be generated for the alert notification ("no" at decision block 512), the process 500 may return to the block 502, so that the workflow engine 102 may generate an alert notification for another troubleshooting operation of the troubleshooting flow.

Figure 6:
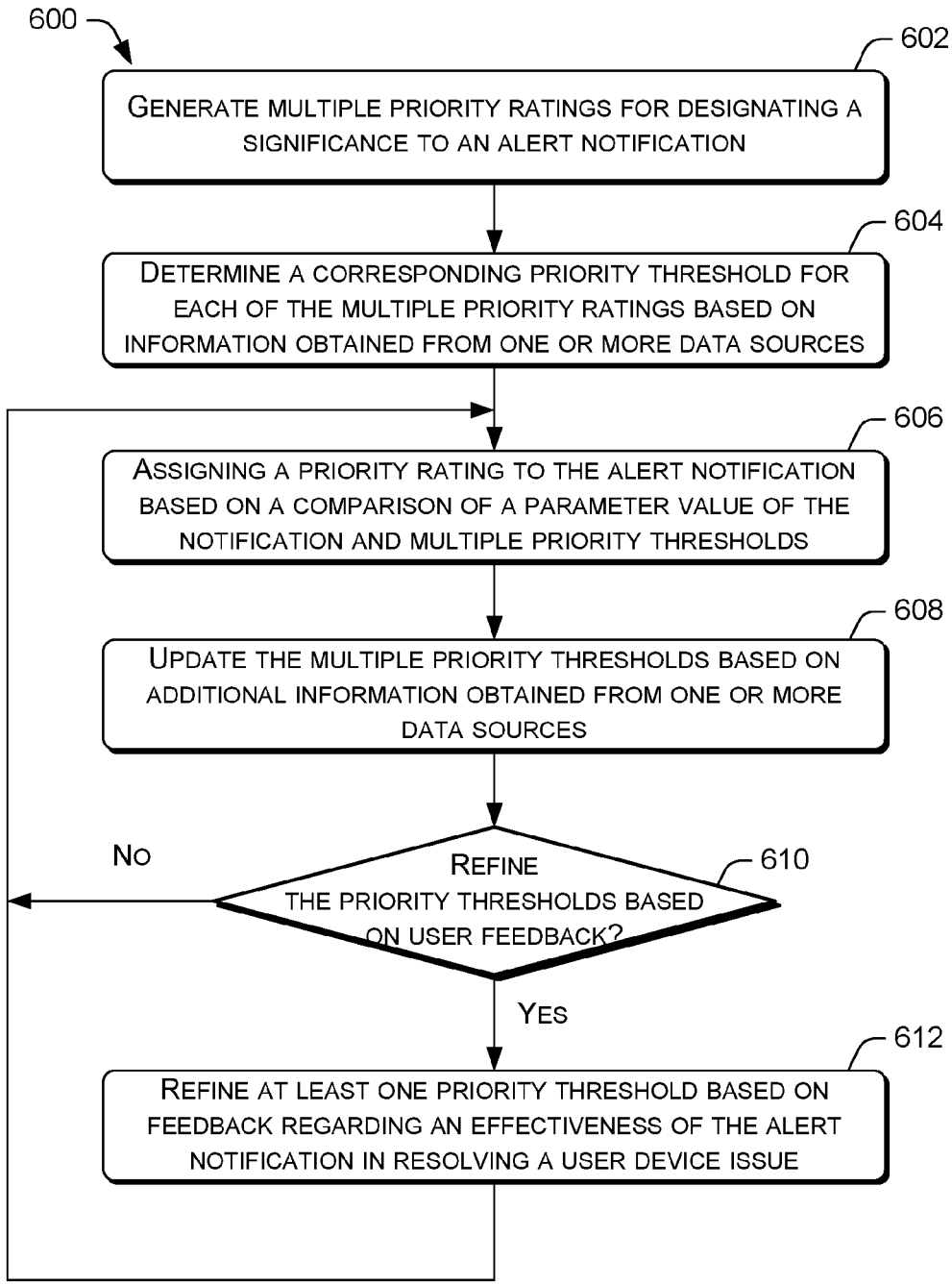
FIG. 6 is a flow diagram of an example process for assigning priority ratings to alert notifications that assist a user in resolving service problems.

FIG. 6 is a flow diagram of an example process 600 for assigning priority ratings to alert notifications that assist a user in resolving service problems. The process 600 may further illustrate block 412 of the process 400. At block 602, the workflow engine 102 may generate multiple priority ratings for designating a significance of an alert notification. For example, the priority ratings may include a high alert rating, a medium alert rating, a low alert rating, or a no alert rating. However, other priority rating systems with different number and expressions of rating levels may be implemented in other embodiments.

At block 604, the workflow engine 102 may determine a corresponding priority threshold for each of the multiple priority ratings based on information obtained from one or more data sources. In various embodiments, each of the priority thresholds may signify a point at which an issue warrants a different amount of attention or a different response from a user due to either an increase or a decrease in the severity of the issue. For example, the priority thresholds may be 30% signal strength for a low alert, 20% signal strength for a medium alert, and 10% signal strength for a high alert.

At block 606, the workflow engine 102 may assign a priority rating to the alert notification based on a comparison of a parameter value of the notification and multiple priority thresholds. Thus, in the context of the priority thresholds described above, a received network signal at a user device that is higher than 30% triggers no alert. However, a received network signal at the user device that is lower than 30% but higher than 20% may trigger a low alert rating. Likewise, a received network signal at the user device that is 20% or lower but higher than 10% may trigger a medium alert rating, and a received network signal at the user device that is 10% or less may trigger a high alert rating.

At block 608, the workflow engine 102 may update the multiple priority thresholds based on additional information obtained from one or more data sources. The priority ratings may be updated to accommodate environmental factors, network improvements, and/or other influences. For example, priority thresholds in the form of signal strength value ranges may be adjusted based on the network data 114 to accommodate seasonal variability as weather affects network signal transmission and reception.

At decision block 610, the workflow engine 102 may determine whether to refine the priority thresholds based on user feedback. The workflow engine 102 may make the determination based on a user configuration. Accordingly, if the workflow engine 102 determines that the priority thresholds are to be refined based on user feedback ("yes" at decision block 610), the process 600 may proceed to block 612.

At block 612, the workflow engine 102 may refine at least one priority threshold based on feedback regarding an effectiveness of the alert notification in resolving a user device issue. For example, the effectiveness statistics may show that users are more responsive to alert notifications when the priority rating of the alert notification are high. Accordingly, the priority thresholds for an alert notification may be adjusted so that another alert notification of the same type will have a high priority rating instead of a medium or low priority rating. Subsequently, the process 600 may loop back to block 606, so that a priority rating may be assigned to another alert notification. Returning to decision block 610, if the workflow engine 102 determines that the priority thresholds are not to be refined based on user feedback ("no" at decision block 610), the process 600 may directly loop back to block 606.

Figure 7:
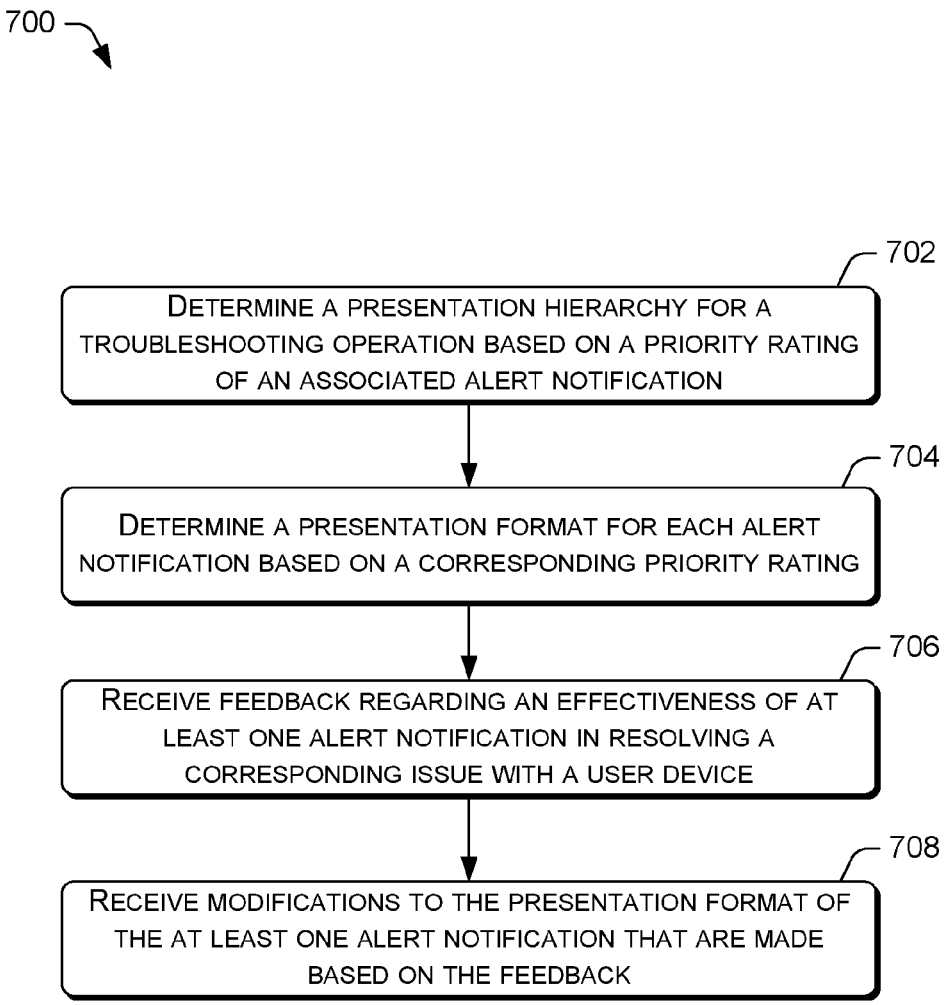
FIG. 7 is a flow diagram of an example process for determining a presentation layout for troubleshooting operations and alert notifications that are used to assist a user in resolving service problems.

FIG. 7 is a flow diagram of an example process 700 for determining a presentation layout for troubleshooting operations and alert notifications that are used to assist a user in resolving service problems. The process 700 may further illustrate block 414 of the process 400. At block 702, the workflow engine 102 may determine a presentation hierarchy for a troubleshooting operation. In various embodiments, the presentation hierarchy of the troubleshooting operation may be dependent on whether the troubleshooting operation has an associated alert notification, and if so, a priority rating of the associated alert notification. For example, a troubleshooting operation with an alert notification of a higher priority rating may be shown higher in a hierarchy than a troubleshooting operation with an alert notification of a lower priority rating. However, the troubleshooting operation with an alert notification of a lower priority rating may nevertheless be show higher in the hierarchy than a troubleshooting operation that does not have an associated alert notification.

At block 704, the workflow engine 102 may determine a presentation style for each alert notification based on a corresponding priority rating. In various embodiments, the alert configuration profile 232 may dictate the particular way that an alert notification of a specific priority rating is to be presented.

At block 706, the workflow engine 102 may receive feedback regarding an effectiveness of at least one alert notification in resolving a corresponding issue with a user device. In various embodiments, an alert notification may be equipped with an effectiveness rating interface. The effectiveness rating interface may enable a user to make a binary assertion of whether the associated step or notification was helpful or not helpful in resolving an issue. Alternatively, the effectiveness rating interface may be a rating scale that enables a user to assign a scale value to the helpfulness of the associated step or notification in resolving the issue.

At block 708, the workflow engine 102 may receive modifications to the presentation format of the at least one alert notification that are made based on the feedback. For example, the effectiveness statistics may show that users respond to specific types of visual or audio indicators more than other types of visual or audio indicators. Hence, the specific types of visual or audio indicators result in a higher resolution of an issue across multiple user devices. Accordingly, a designer of the alert notification may change the presentation of the alert notification to obtain a higher rate of issue resolution.

The use of device data, network data, and account data to automatically streamline troubleshooting flows and prioritized alert notifications may enable users and customer care representatives of a mobile telecommunication carrier to resolve service issues in a more expedient and effective manner. Further, the use of feedback on the effectiveness of such streamlined troubleshooting flows and prioritized alert notifications may reduce the number of calls to customer care of the mobile telecommunication carrier.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. One or more non-transitory computer-readable media storing computer-executable instructions that upon execution cause one or more processors to perform acts comprising:
   selecting a troubleshooting flow to detect one or more problems associated with a user device that uses communication services provided by a wireless telecommunication network;
   determining one or more alert notifications that are relevant to at least one troubleshooting operation of the troubleshooting flow based on information from one or more data sources of multiple data sources of the wireless telecommunication network, each of the one or more data sources being relevantly located with the user device;
   assigning a priority rating to at least one alert notification of the one or more alert notifications;
   assigning a presentation layout to troubleshooting operations of the troubleshooting flow and the one or more alert notifications based on one or more priority ratings;

providing the at least one troubleshooting operation and the one or more alert notifications for presentation on a computing device according to the presentation layout; and wherein a data source is relevantly located with the user device if it is in a same geographic area as the user device, or if it uses the same network resources as the user device.

2. The one or more non-transitory computer-readable media of claim 1, wherein the acts further comprise at least one of filtering out at least one inapplicable troubleshooting operation from the troubleshooting flow based on information from the one or more data sources, or extracting information from the one or more data sources to eliminate one or more troubleshooting operations from the troubleshooting flow.

3. The one or more non-transitory computer-readable media of claim 2, wherein the multiple data sources include data from multiple cellular devices stored in at least two or more of a network information database that stores network data regarding technical and operational status collected from the wireless telecommunication network, a device information database that stores device data regarding technical capabilities, feature settings, and operational status collected from the user device, a user account database that stores account details associated with the user device, and a third-party database that provides supplemental information.

4. The one or more non-transitory computer-readable media of claim 1, wherein the selecting the troubleshooting flow includes selecting the troubleshooting flow in response to a request from a device management application on the user device, a customer care application on a customer care terminal, a network management application of the wireless telecommunication network, or a third-party application.

5. The one or more non-transitory computer-readable media of claim 1, wherein the determining the one or more alert notifications include:
   generating an alert notification for a troubleshooting operation of the troubleshooting flow;
   ascertaining whether the alert notification is to be presented based on a notification parameter;
   configuring the alert notification for presentation with an associated troubleshooting operation in response to the notification parameter indicating that the alert notification is to be presented; and
   configuring the alert notification to be hidden from presentation in response to the notification parameter indicating that the alert notification is to be suppressed.

6. The one or more non-transitory computer-readable media of claim 5, wherein the configuring the alert notification to be hidden includes permanently suppressing the alert notification from presentation or suppressing the alert notification from presentation for a predetermined period of time based on the notification parameter.

7. The one or more non-transitory computer-readable media of claim 1, further comprising determining an alert trend for the alert notification based on a history of the alert notification, and providing the alert trend to the computing device for presentation.

8. The one or more non-transitory computer-readable media of claim 1, wherein the assigning the priority rating to the at least one alert notification includes:
   generating multiple priority ratings for designating a significance to an alert notification;
   determining a corresponding priority threshold for each of the multiple priority ratings based on information obtained from the one or more data sources of the wireless telecommunication network; and
   assigning a priority rating to the alert notification based on a comparison of a parameter value of the alert notification and multiple priority thresholds.

9. The one or more non-transitory computer-readable media of claim 8, further comprising at least one of updating the multiple priority thresholds based on additional information obtained from one or more data sources, or refining at least one priority threshold based on feedback regarding an effectiveness of the alert notification in resolving a user device issue.

10. The one or more non-transitory computer-readable media of claim 1, wherein the assigning a presentation layout includes determining a presentation hierarchy for a troubleshooting operation based on a priority rating of an associated alert notification, and determining a presentation format for each alert notification based on a priority rating of each alert notification.

11. The one or more non-transitory computer-readable media of claim 10, further comprising receiving feedback regarding an effectiveness of at least one alert notification in resolving a corresponding issue with a user device, and receiving modifications to the presentation format of the at least one alert notification that are made based on the feedback.

12. The one or more non-transitory computer-readable media of claim 1, wherein the acts further comprise storing the at least one troubleshooting operation and the one or more alert notifications in an outbox, wherein the providing includes providing the at least one troubleshooting operation and the one or more alert notifications that is stored in the outbox to an application on a computing device that is different from an application that requested the troubleshooting flow.

13. The one or more non-transitory computer-readable media of claim 1, wherein a troubleshooting operation of the troubleshoot flow includes at least one of a knowledge base article or a call to action for resolving a problem of the user device.

14. A computer-implemented method, comprising:
   selecting a troubleshooting flow to detect one or more problems associated with a user device that uses communication services provided by a wireless telecommunication network;
   receiving data from each of multiple network data sources that share a geographic or network location with the user device;
   filtering out at least one inapplicable troubleshooting operation from the troubleshooting flow based on information from the data sources of multiple data sources of the wireless telecommunication network;
   determining one or more alert notifications that are relevant to at least one troubleshooting operation of the troubleshooting flow based on information from the multiple data sources;
   assigning a priority rating to at least one alert notification of the one or more alert notifications;
   assigning a presentation layout to troubleshooting operations of the troubleshooting flow and the one or more alert notifications based on one or more priority ratings; and
   providing at least one troubleshooting operation and the one or more alert notifications for presentation on a computing device according to the presentation layout.

15. The computer-implemented method of claim 14, further comprising extracting information from the multiple data sources to eliminate one or more troubleshooting operations from the troubleshooting flow.

16. The computer-implemented method of claim 14, wherein the multiple data sources further include at least two or more of a network information database that stores network data regarding technical and operational status of the wireless telecommunication network collected from the wireless telecommunication network, a device information database that stores device data regarding technical capabilities, feature settings, and operational status of the user device, a user account database that stores account details associated with the user device and collected from the user device, and a third-party database that provides supplemental information.

17. The computer-implemented method of claim 14, wherein the selecting the troubleshooting flow includes selecting the troubleshooting flow in response to a request from a device management application on the user device, a customer care application on a customer care terminal, a network management application of the wireless telecommunication network, or a third-party application.

18. The computer-implemented method of claim 14, wherein the determining the one or more alert notifications include:
generating an alert notification for a troubleshooting operation of the troubleshooting flow;
ascertaining whether the alert notification is to be presented based on a notification parameter;
configuring the alert notification for presentation with an associated troubleshooting operation in response to the notification parameter indicating that the alert notification is to be presented; and
configuring the alert notification to be hidden from presentation in response to the notification parameter indicating that the alert notification is to be suppressed.

19. A system, comprising:
one or more processors; and
memory including a plurality of computer-executable components that are executable by the one or more processors to perform a plurality of actions, the plurality of actions comprising:
selecting a troubleshooting flow to detect one or more problems associated with a user device that uses communication services provided by a wireless telecommunication network;
receiving data from each of multiple network data sources that are located to the user device by geographic or network location, said data related to a location of the multiple network data sources and the user device;
filtering out at least one inapplicable troubleshooting operation from the troubleshooting flow based on information from the multiple data sources of the wireless telecommunication network;
extracting information from the multiple data sources to eliminate one or more troubleshooting operations from the troubleshooting flow;
determining one or more alert notifications that are relevant to at least one troubleshooting operation of the troubleshooting flow based on information from the multiple data sources;
assigning a priority rating to at least one alert notification of the one or more alert notifications;
assigning a presentation layout to troubleshooting operations of the troubleshooting flow and the one or more alert notifications based on one or more priority ratings; and
providing at least one troubleshooting operation and the one or more alert notifications for presentation on a computing device according to the presentation layout.

20. The system of claim 19, wherein the assigning the priority rating to the at least one alert notification includes:
generating multiple priority ratings for designating a significance to an alert notification;
determining a corresponding priority threshold for each of the multiple priority ratings based on information obtained from the multiple data sources of the wireless telecommunication network; and
assigning a priority rating to the alert notification based on a comparison of a parameter value of the alert notification and multiple priority thresholds, and
wherein the assigning a presentation layout includes determining a presentation hierarchy for a troubleshooting operation based on a priority rating of an associated alert notification, and determining a presentation format for each alert notification based on a priority rating of each alert notification.

* * * * *